(12) United States Patent
Wilson et al.

(10) Patent No.: US 6,352,313 B1
(45) Date of Patent: *Mar. 5, 2002

(54) BRUSH TUFTING

(75) Inventors: Kenneth Bradley Wilson; Gerald S. Szczech, both of Iowa City, IA (US)

(73) Assignee: Gillette Canada Company', Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,004

(22) Filed: Aug. 25, 1999

(51) Int. Cl.[7] .............................. A46B 3/04; A46B 9/04
(52) U.S. Cl. .............................. 300/8; 300/4; 425/123; 425/805
(58) Field of Search .............................. 300/4, 5, 8, 21; 425/123, 190, 805

(56) References Cited

U.S. PATENT DOCUMENTS

| | | | | |
|---|---|---|---|---|
| 798,380 A | * | 8/1905 | Alexander | 300/21 |
| 2,298,156 A | * | 10/1942 | Person | 300/21 |
| 2,592,296 A | * | 4/1952 | Kutik | 425/805 |
| 3,026,146 A | * | 3/1962 | Szabo et al. | 300/21 |
| 3,577,843 A | * | 5/1971 | Kutik | 425/805 |
| 3,836,199 A | * | 9/1974 | Blankschein | 300/21 |
| 4,635,313 A | | 1/1987 | Fassler et al. | |
| 4,893,876 A | * | 1/1990 | Weihrauch | 300/21 |
| 4,988,146 A | | 1/1991 | Weihrauch | |
| 5,224,763 A | | 7/1993 | Dirksing | |
| 5,454,626 A | * | 10/1995 | Schiffer | 300/21 |
| 5,458,400 A | | 10/1995 | Meyer | |
| 5,609,890 A | | 3/1997 | Boucherie | |

FOREIGN PATENT DOCUMENTS

| | | | |
|---|---|---|---|
| DE | 44 20 757 A1 | 12/1995 | |
| JP | 46-29989 | * 8/1971 | 425/805 |
| JP | 0905477 | 3/1997 | |
| WO | WO 98/37787 | 9/1998 | |

* cited by examiner

Primary Examiner—Terrence R. Till
(74) Attorney, Agent, or Firm—David A. Howley

(57) ABSTRACT

The composite brush mold includes a) a first component that includes a pattern of holes extending from a first surface of the first component to a second surface of the first component, the holes being configured to receive tufts that include at least one bristle, and b) a second component that includes a pattern of fingers that correspond to the pattern of holes, the fingers extending into the holes to form end walls.

28 Claims, 10 Drawing Sheets

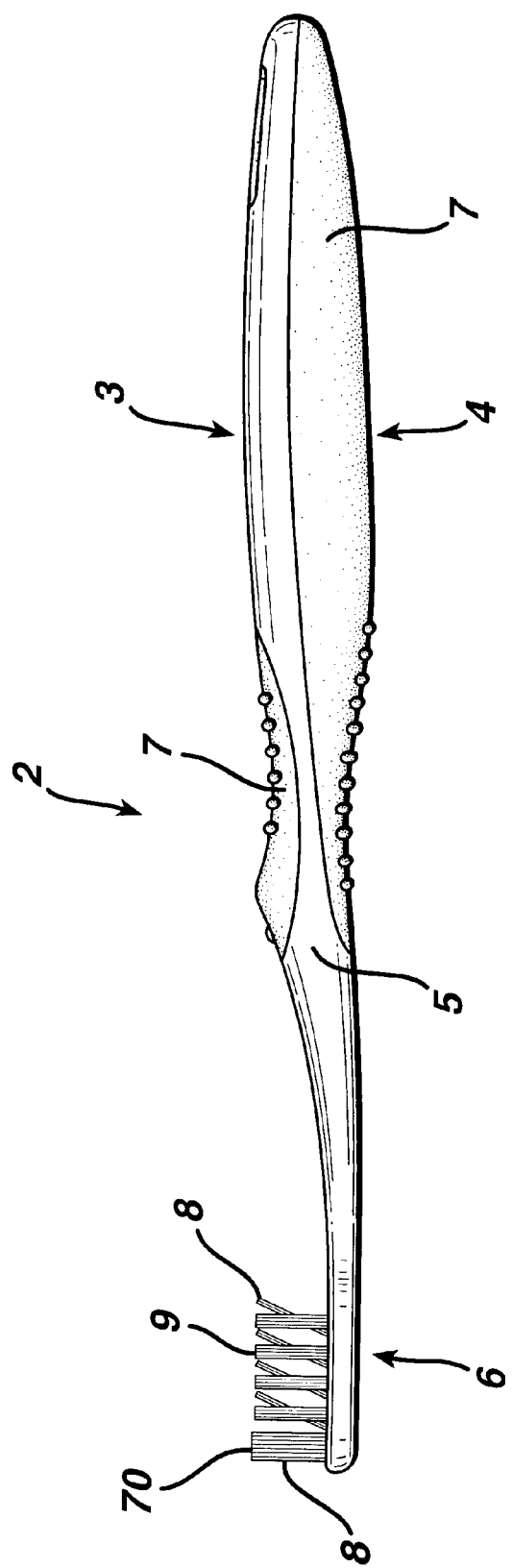

BRUSH TUFTING

BACKGROUND OF THE INVENTION

The invention relates to tufting brushes.

Toothbrushes generally include a body having a handle portion, a head portion, and bristles extending from the head portion. The bristles can be arranged in the form of a number of tufts.

Toothbrushes are manufactured by injecting liquid plastic into a mold cavity that defines a toothbrush body. Tufts of bristles are then attached to the head portion of the toothbrush body in a process generally known as tufting. Tufting of toothbrushes can be done by stapling, hot tufting, welding or molding tufts of bristles into the toothbrush body.

SUMMARY OF THE INVENTION

The invention relates to a composite mold in which tufts of bristles can be inserted and maintained in a predetermined position while being subjected to an injection molding operation to form a brush. The composite mold includes a mold cavity defining a portion of an oral brush head.

In one aspect, the invention features a composite brush mold that includes a) a first component that includes a pattern of holes extending from a first surface of the first component to a second surface of the first component, the holes being configured to receive tufts that include at least one bristle, and b) a second component that includes a pattern of fingers that correspond to the pattern of holes, the fingers extending into the holes to form end walls.

In some embodiments, the mold further includes a bar that includes an opening extending therethrough, the first component and the second component being positioned in the opening of the bar. In one embodiment, the bar includes a plurality of openings extending therethrough. In other embodiments, the mold further includes a plurality of the first components and a plurality of the second components, in which the first components and the second components are positioned in the openings of the bar. In one embodiment, the opening in the bar extends through the bar in a first direction, and the bar further includes a ledge extending into the opening in a second direction, the second direction being substantially perpendicular to the first direction.

In other embodiments, the first component is plastic. In one embodiment, the first component is plastic and the second component is plastic.

In another embodiment, the bar further includes guide pins positioned to align the first component in the opening of the bar.

In some embodiments, the first component further includes a cavity located at the first surface of the first component such that the holes extend from the cavity, and the cavity defines a portion of an oral brush from which tufts of bristles extend.

In one embodiment, the second component further includes a base, a first finger extending from the base at a first angle to the base, and a second finger extending from the base at a second angle to the base, the second angle being different from the first angle. In other embodiments, the second component further includes a base secured to the first component and the fingers extend from the base. In another embodiment, the mold further includes a cover positioned to maintain the fingers in position within the first component.

In other embodiments, at least one of the holes, when taken in cross-section, defines a shape selected from the group consisting of a circle, triangle, square, rectangle, rhombus, ellipse, star, oval, and crescent.

In another embodiment, the pattern of holes includes a first plurality of holes and a second plurality of holes.

In one embodiment, the second component includes a first plurality of fingers dimensioned to be inserted into the first plurality of holes, and a second plurality of fingers dimensioned to be inserted into the second plurality of holes. In some embodiments, the first plurality of holes extend at a first angle to the first surface, and the second plurality of holes extend at a second angle to the first surface, the second angle being different from the first angle. In some embodiments, the second component includes a base, a first plurality of fingers extending from the base at an angle corresponding to the angle of the first plurality of holes, and a second plurality of fingers extending from the base at an angle corresponding to the angle of the second plurality of holes. In one embodiment, the second component further includes a first subpart that includes a base and a first plurality of fingers corresponding to the first plurality of holes, and a second subpart that includes a base and a second plurality of fingers corresponding to the second plurality of holes.

In other embodiments, the first plurality of holes have a first cross-section, and the second plurality of holes have a second cross-section, the first cross-section being different from the second cross-section.

In one embodiment, the second component further includes a first subpart that includes a base and a first plurality of the fingers corresponding to the first plurality of holes, and a second component that includes a base and a second plurality of the fingers corresponding to the second plurality of holes. The holes of the first plurality of holes can be circular in cross-section, elliptical in cross-section, circular in cross-section, or a combination thereof. The holes of the first plurality of holes can be circular in cross-section and the holes of the second plurality of holes can be elliptical in cross-section.

In preferred embodiments, the composite mold is dimensioned to be inserted into an apparatus for manufacturing oral brushes. In one embodiment, the mold further includes a plurality of cavities located at the first surface of the first component such that the pattern of holes extends from the cavities to the second surface, each cavity defining a portion of an oral brush from which tufts extend. In other embodiments, the mold further includes a plurality of the second components. In one embodiment, at least one of the holes of the pattern of holes is a bisected oval in cross-section.

In some embodiments, the second component includes a plastic selected from the group consisting of polyethylene, polypropylene, polyurethane, or a combination thereof. In other embodiments, the second component is metal.

In another aspect, the invention features a composite mold that includes: a) a bar having a plurality of openings extending therethrough, b) a first plastic component that includes a pattern of holes extending from a first surface of the first component to a second surface of the first component, the holes being configured to receive tufts that include at least one bristle, and c) a second plastic component that include a pattern of fingers that correspond to the pattern of holes, the fingers extending into the holes to form end walls, the first and second components being positioned in an opening of the bar. In one embodiment, the mold further includes a plurality of the first and the second components, each of the first and second components being positioned in an opening of the bar.

In other aspects, the invention features a method for forming a brush that includes contacting a first end of a tuft of bristles extending from a hole in an above-described composite mold with molding compound to form a brush.

In one embodiment, the method further includes inserting a second end of a tuft that includes at least one bristles into a hole of the composite mold such that the first end of the tuft of bristles extends beyond the composite mold.

In one aspect, the invention features a composite brush mold that includes a) a first component that includes a pattern of holes extending from a first surface of the first component to a second surface of the first component, in which the holes are configured to receive tufts that include at least one bristle, and b) a second component that includes a pattern of fingers that correspond to the pattern of holes, where the fingers extend into the holes to form end walls. Preferably the first and second components are plastic.

By using a composite mold, bristles may extend at a variety of angles to the surface of the brush head. The bristles can also extend to a variety of heights from the brush head. The ability to vary the topography of the second component while maintaining the same two-dimensional pattern at the base of the second component allows the use of multiple second components with a single first component.

Particular advantages exist when the first and second components are plastic. Plastic is inexpensive to manufacture and modify relative to the costs associated with manufacturing and modifying the topography in metallic molds, thus providing design flexibility. In addition, because the plastic component can be produced from a mold, the dimensions of the plastic component can be produced with excellent precision and accuracy. The plastic component also can be replaced when it wears out or is no longer working.

The properties of plastic enable the first and second components to maintain a sufficiently tight relationship with each other when the two components are mated to each other, while allowing the easy separation of the two components when disassembly is desired. The ability to disassemble the composite mold enables the mold and the holes therein to be easily cleaned.

In addition, because both the first component and the second component can be removed from the transfer bar, individual first and second components can be discarded and replaced without destroying the utility of the entire transfer bar. Once the defective component is replaced, the bar can be used at full capacity.

Other features of the invention will be apparent from the following description of the preferred embodiments thereof, and from the claims.

BRIEF DESCRIPTION OF THE DRAWING

FIG. 1 is a side view of a toothbrush body.

DESCRIPTION OF THE PREFERRED EMBODIMENTS

Figure 2A:
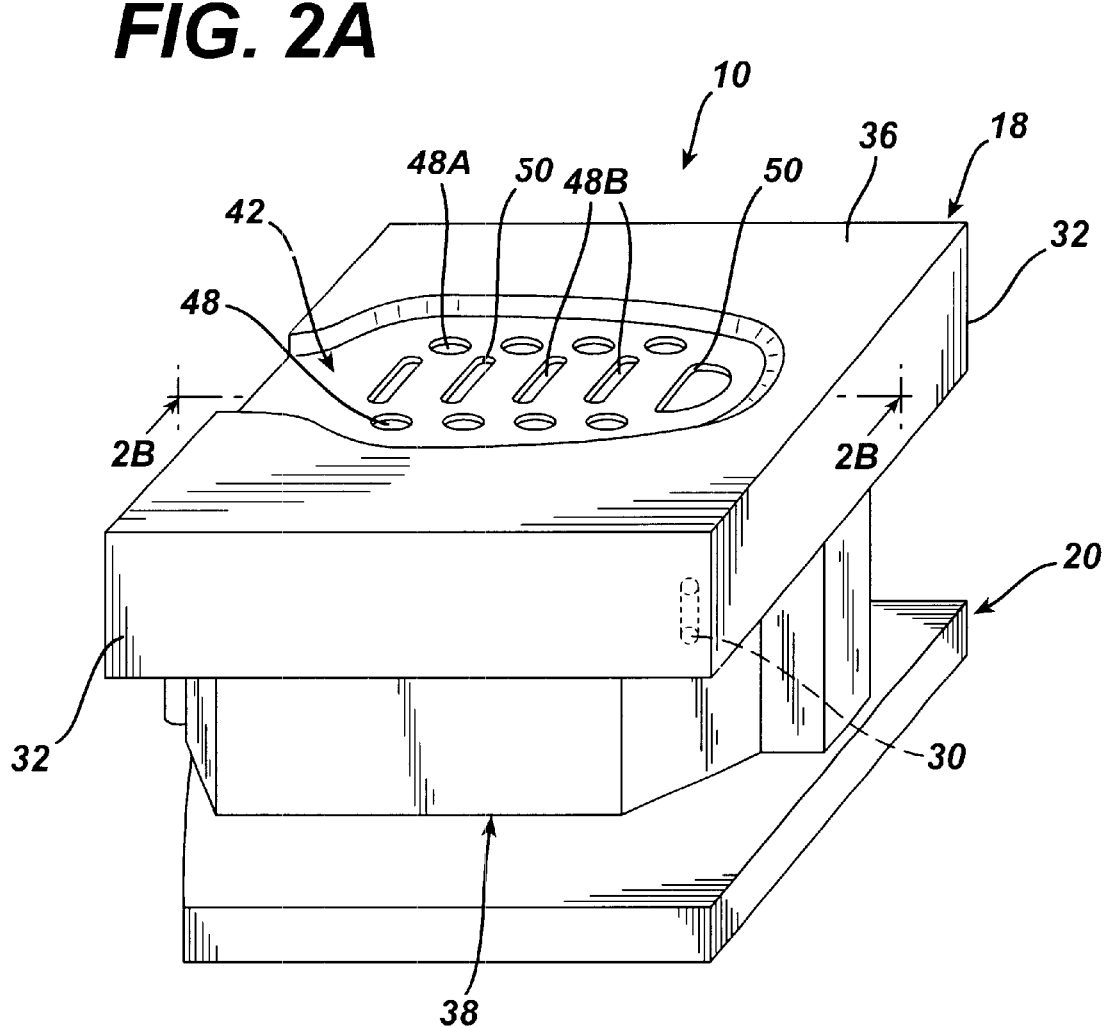
FIG. 2A is a perspective side view of a composite mold according to one embodiment of the invention with dotted lines indicating the extension of holes through the first component of the mold.

Referring to FIG. 1, toothbrush 2 includes toothbrush body 3 that includes handle portion 4, and head portion 6. Tufts 8, which include at least one bristle 9, extend from head portion 6. The bristles 9 of the toothbrush can be of a variety of dimensions, shapes, colors, and compositions. Toothbrush body 3 can further include a base member 5, e.g., a portion made from a relatively harder, more rigid plastic such as polypropylene, and a gripping member 7, e.g., a portion made from a relatively rubbery material such as, e.g., styrene-butadiene-styrene copolymer. Multiple component toothbrush bodies are described in, e.g., U.S. application Ser. No. 09/293,262 filed on Apr. 16, 1999, and Ser. No. 09/293,019 filed on Apr. 16, 1999, and incorporated herein.

As shown in FIGS. 2–8, a composite mold 10 includes a first component 18 and a second component 20 mated together.

The first component 18 of the composite mold 10 has a first surface 36 that includes a mold cavity 42 dimensioned to define a portion of a toothbrush body 3, e.g., a portion of the head 6 of a toothbrush 2. The mold cavity 42 is constructed to be mated with a second mold cavity 44 defined by a mold half 46, to more completely define the toothbrush body 3 to be manufactured using the composite mold 10, as described in greater detail below with respect to FIG. 8.

Holes 48 defined by the side walls 50 of first component 18 extend from the first surface 36 of the first component 18 to the second surface 38 of the first component 18. The holes 48 are arranged in a pattern and dimensioned to correspond to the arrangement and dimensions of the tufts 8 of the oral brush 2 to be manufactured using the composite mold 10. The pattern of holes 48 can include holes occurring at regular intervals, irregular intervals and combinations thereof. Each hole 48 is dimensioned to receive a tuft 8 and will hereinafter be referred to as a "tuft hole."

The tuft holes 48 can extend into the first component 18 at a variety of angles to the first surface 36 of the first component 18. For example, the tuft holes 48A at the exterior of the pattern of holes can extend substantially vertically (i.e., 90°) into the first component 18, and the tuft holes 48B at the interior portion of the pattern can extend at an angle that is less than 90° (e.g., 45°) from the surface 36 of the first component 18.

Figure 2B:
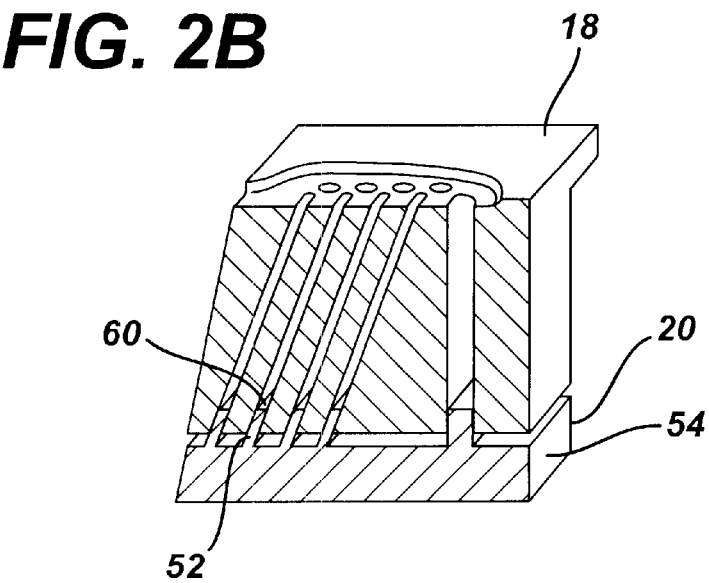
FIG. 2B is a view taken in cross-section along line 2B—2B of FIG. 2A.
Figure 3A:
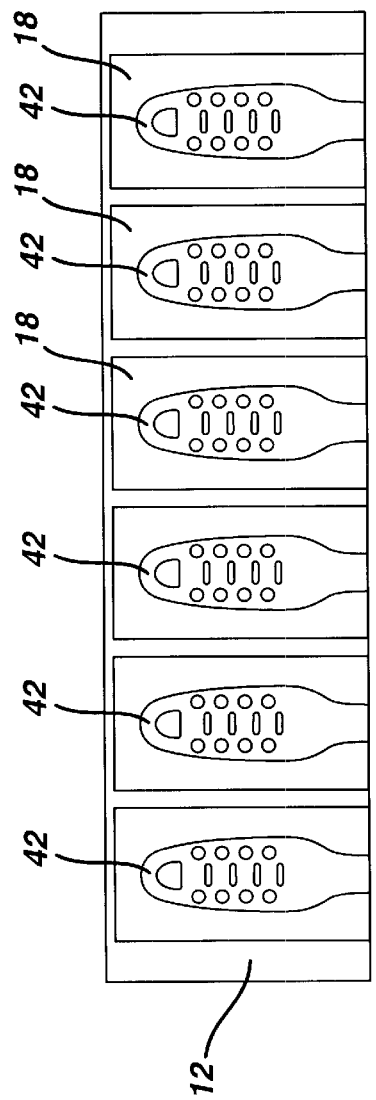
FIG. 3A is a top view of a transfer bar including the composite mold of FIG. 2A.
Figure 3B:
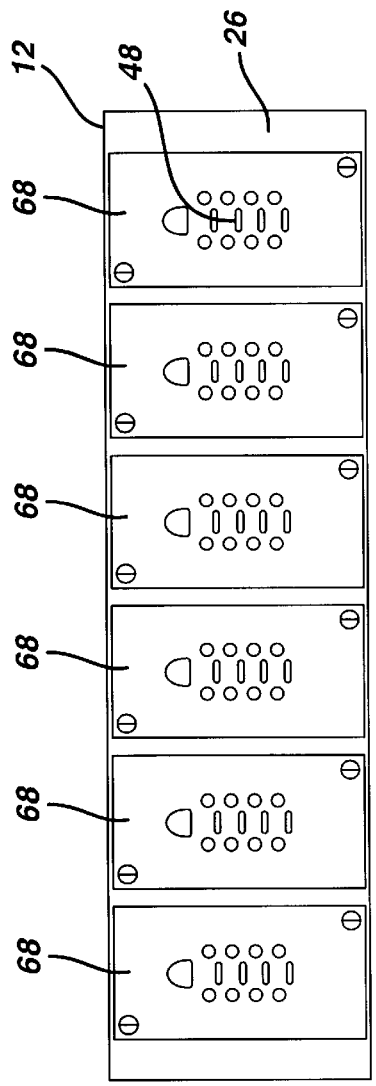
FIG. 3B is a bottom view of FIG. 3A including a number of covers.
Figure 3C:
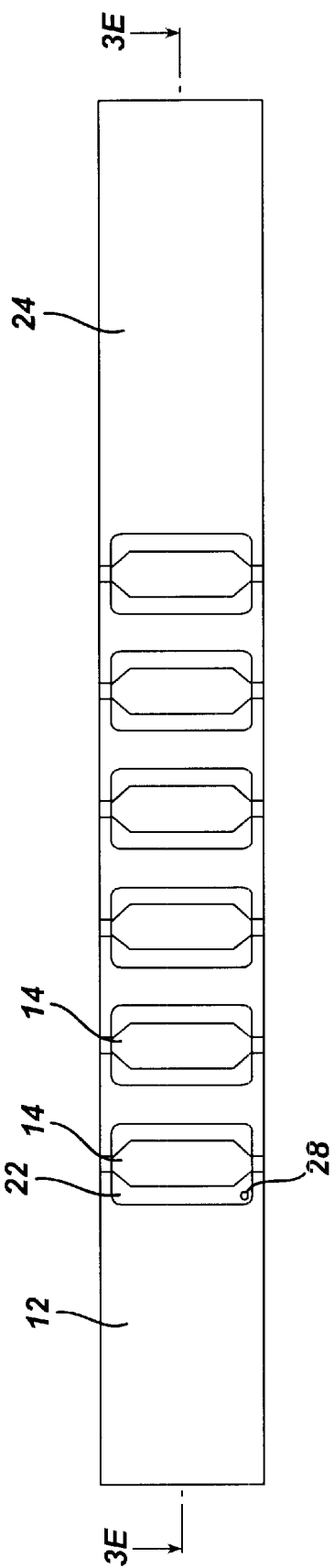
FIG. 3C is an enlarged top view of the transfer bar of FIG. 3A.
Figure 3D:
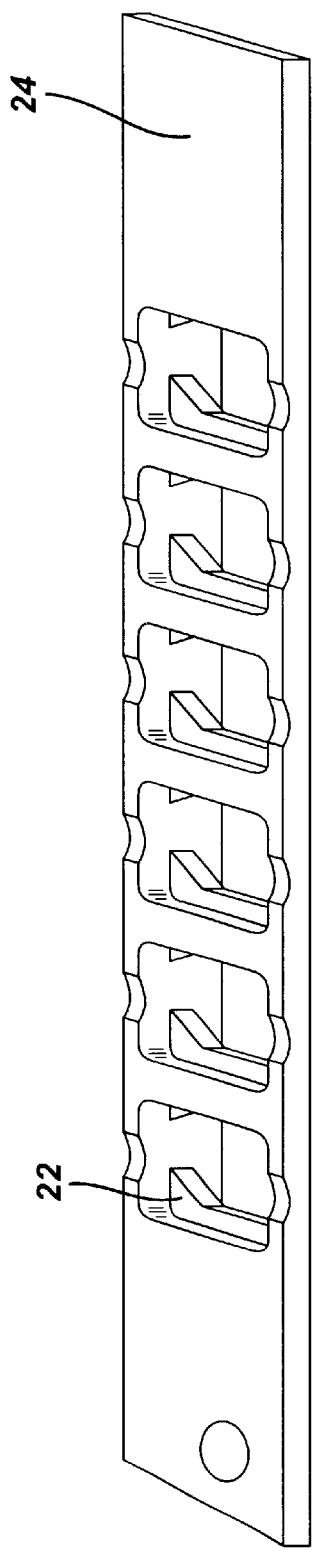
FIG. 3D is a perspective top view of the transfer bar of FIG. 3C.
Figure 3E:
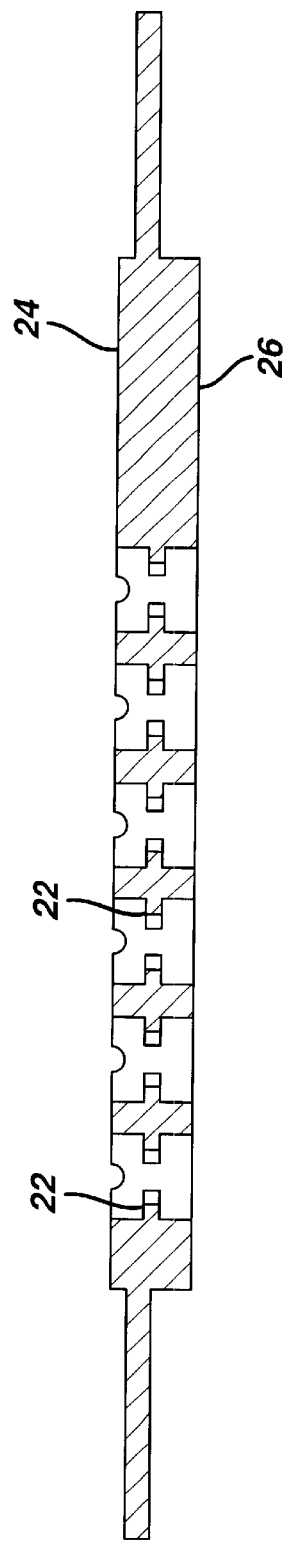
FIG. 3E is a view taken in cross-section along line 3E—3E of the bar of FIG. 3C.
Figure 3F:
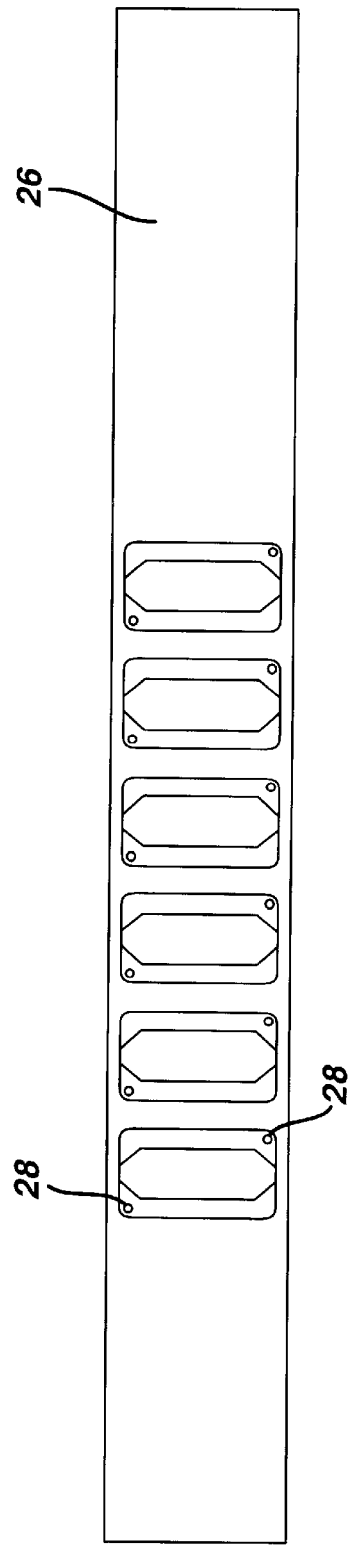
FIG. 3F is a bottom view of the transfer bar of FIG. 3C.
Figure 4A:
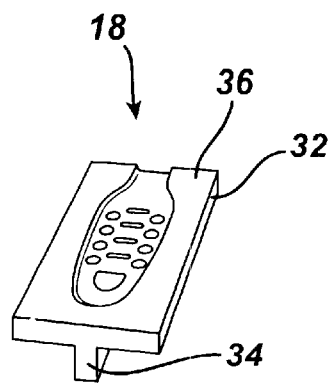
FIG. 4A is a perspective top view of the first component of the composite mold of FIG. 2A.
Figure 4B:
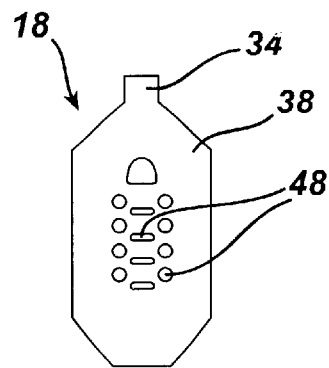
FIG. 4B is a bottom view of the first component of FIG. 4A.
Figure 4C:
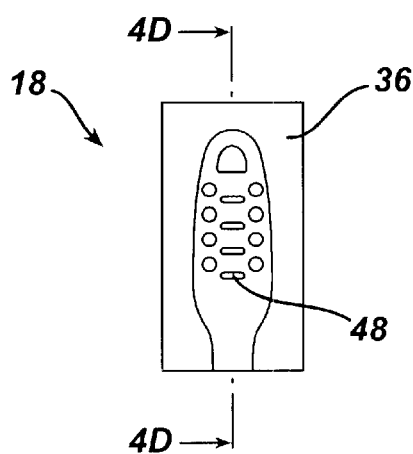
FIG. 4C is a top view of the first component of FIG. 4A.
Figure 4D:
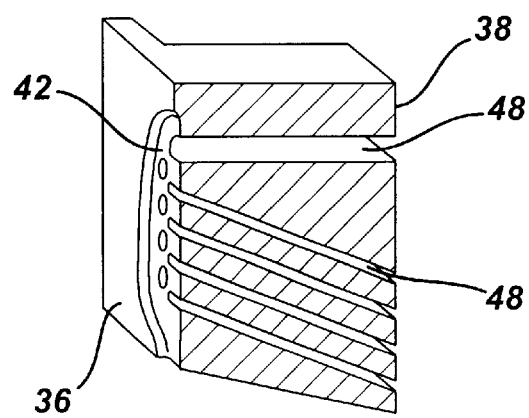
FIG. 4D is a view taken in cross-section along line 4D—4D of the first component of FIG. 4C.

The first component 18 can include a variety of differently dimensioned holes 48 having a variety of differently shaped cross-sections, which define shapes such as, e.g., circle, ellipse, oval, star, triangle, square, rectangle, rhombus, pentagon, hexagon, and crescent, and bisected shapes. Referring to FIGS. 2A and 2B, the exterior tuft holes 48A are generally cylindrical and have a circular cross-section, and the interior tuft holes 48B are generally elliptical in cross-section.

The second component 20 of the composite mold 10 includes individual fingers 52 that arrest the travel of the tufts 8 through the holes 48 of first component 18 such that an inserted tuft 8 does not exit the composite mold 10. The individual fingers 52 of the second component 20 also establish the tuft topography of the brush 2 produced therefrom as described in more detail below.

Referring also to FIGS. 2 and 6–8, the second component 20 includes a base 54 and fingers 52 extending from a first surface 56 of the base 54 and terminating at a first end 58. The fingers 52 are dimensioned and positioned on the base 54 to correspond to the tuft hole 48 pattern of the first component 18 such that the fingers 52 of the second component 20 can be inserted into the tuft holes 48 from the second surface 38 of the first component 18 where the first end 58 of finger 52 forms an end wall 60 in the tuft holes 48. The fingers 52 thus prevent a tuft 8 that has been inserted into the tuft hole 48 from the first surface 36, from exiting the tuft hole 48 at the second surface 38 of the first component 18.

The fingers 52 extend away from the base 54 and can extend into the tuft holes 48 to different distances. The distance a finger 52 extends into a tuft hole 48 will define the distance a corresponding tuft 8 will extend from a brush molded therefrom. The extent to which individual fingers 52 extend into tuft holes 48 can be varied to provide the desired surface contour (i.e., topography) of the brushing surface of a brush molded therewith.

Fingers 52 can also include a tip 62. Tip 62 can facilitate retention of a tuft 8 in the tuft hole 48. When a tuft 8 is inserted into a tuft hole 48, tip 62 aids in creating a pressure fit between the bristle(s) 9 of the tuft 8 and the side walls defining the tuft hole 48. The pressure fit aids in maintaining the tuft 8 in the tuft hole 48. Tip 62 also aids in maintaining the position of the tuft 9 in the molded brush 2 throughout the brush making process including, e.g., molding and transport operations.

The second component 20 can also include a number of subparts 64 and 66 that can include a variety of differently dimensioned fingers 52. Subpart 64 includes a number of fingers 52a extending at a first angle ∠a to the surface of the base 54a of subpart 64. Similarly, subpart 66 includes a number of fingers 52b extending at a second angle ∠b (different from the first angle) to the surface 56 of the base 54b of subpart 66. Preferably the subparts interlock with each other.

The second component 20 can be capable of being secured to the first component 18. The second component can also include a cover 68 for maintaining the subparts 64 and 66 of the second component 20 in fixed relationship with each and for use in securing the second component 20 in position against the first component 18 or the transfer bar 12. Cover 68 can fit over the base 54 of second component 20 and can be secured to first component 18 at surface 38 or to the transfer bar 12. Any suitable mechanism for securing the second component 20 (e.g., base 54) or the cover 68 in position against the first component 18 or the transfer bar 12 can be used including, e.g., screwing, clipping, snapping, and gluing, and combinations thereof, the cover 68 into position. Preferably the cover 68 can be easily removed from and secured to the first component 18 or the transfer bar 12.

Suitable first and second components can be made from a variety of materials including metal and plastic. Preferably the first and second components are of a plastic that includes a polymer, e.g., thermoset polymers, thermoplastic polymers, thermoplastic elastomeric polymers, rubber polymers, and combinations thereof. Preferred polymers include polyurethane and polyolefins, e.g., polyethylene and polypropylene.

Referring to FIGS. 3A–3F. The composite mold 10 can also include a transfer bar 12 that has any number of openings 14. The first component 18 of the composite mold 10 can be inserted into opening 14 from the top surface 24 of the transfer bar 12. The second component 20 can be joined to the first component 18 by inserting the second component 20 into opening 14 from the bottom surface 26 of the transfer bar 12 and pressing the two components 18, 20 together.

The transfer bar 12 provides a support capable of holding components 18, 20 of the composite mold 10, and a structure for transporting the composite mold 10. The openings 14 in the transfer bar 12 are dimensioned to receive the first component 18 of the composite mold 10 and the second component 20 of the composite mold 10. A ledge 22 positioned in the opening 14 at a point intermediate the top surface 24 and the bottom surface 26 of the transfer bar 12 extends into the opening 14. The travel of the first component 18 as it passes into opening 14 from the first surface 24 of the transfer bar 12 is arrested when flange 32 of first component 18 contacts ledge 22 of the transfer bar 12. The ledge 22 also arrests the travel of the second component 20 as it passes into opening 14 from the second surface 26 of the transfer bar 12.

Preferably the transfer bar includes guide pins 28 positioned at ledge 22 to align the position of the first component 18 in opening 14. The guide pins 28 extend into guide holes 30 in first component 18 to assist in the alignment of the position of the first component 18 in the opening 14 of the transfer bar 12. The transfer bar 12 can also include guide-pins 28 that extend from the ledge 22 toward the bottom surface 26 of the transfer bar 12 and into guide holes (not shown) on the second component 20 to align the position of the second component 20 in opening 14. The transfer bar 12 is also constructed such that it can be transferred into and out of an injection molding apparatus as described in more detail below. The transfer bar is preferably fabricated from metal.

The composite mold is constructed such that it can be transferred to and from the various operations in the brush making process, e.g., tufting and brush molding operations. In addition, the composite mold is capable of being inserted into an apparatus for molding brushes, e.g., an injection molding apparatus for molding multiple toothbrushes, such that it forms a portion of the mold.

Figure 5:
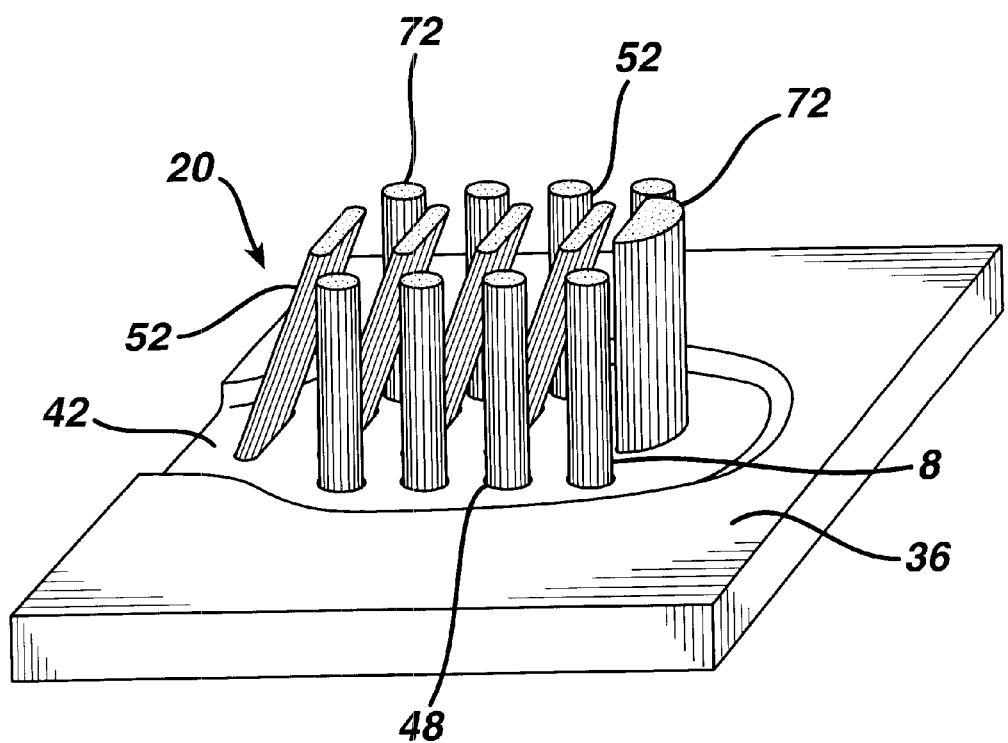
FIG. 5 is a perspective top view of the first component of FIG. 2A filled with tufts.
Figure 6A:
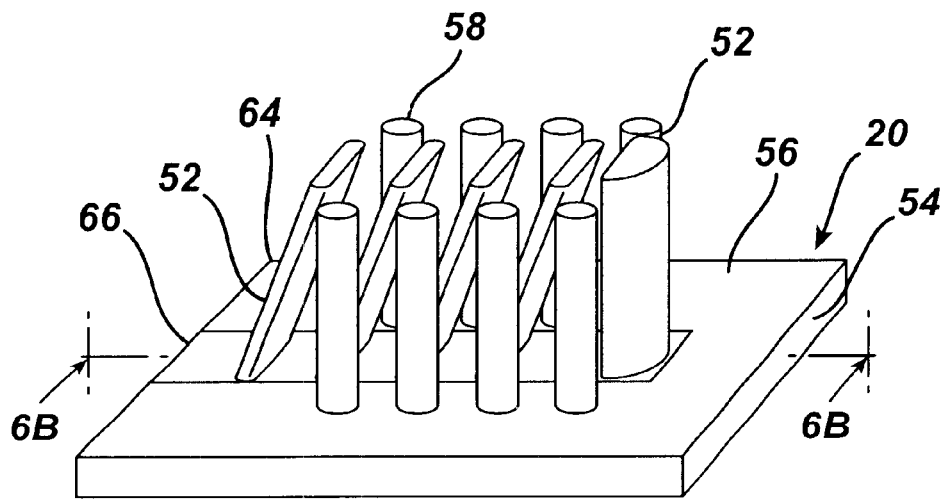
FIG. 6A is a perspective side view of the second component of the composite mold of FIG. 2A.
Figure 6B:
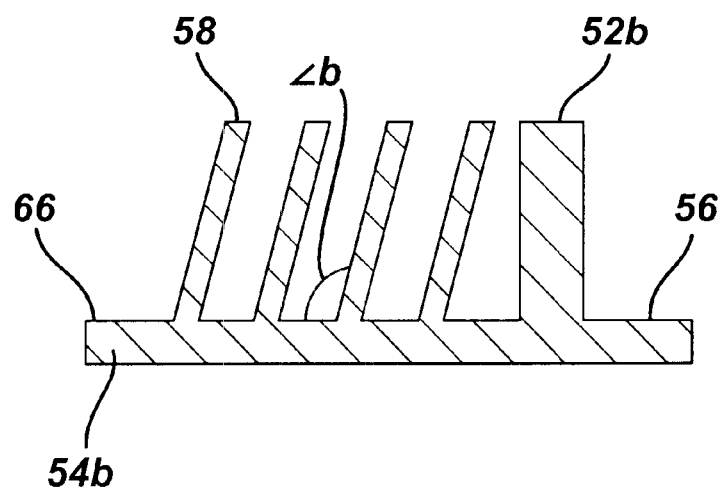
FIG. 6B is a view taken in cross-section along line 6B—6B of the second component of FIG. 6A.
Figure 6C:
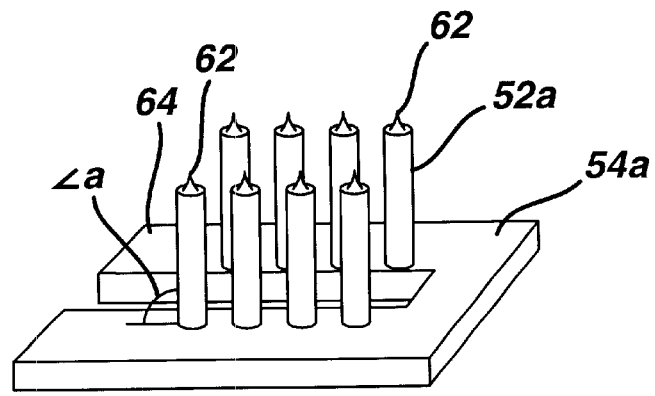
FIG. 6C is an enlarged perspective top view of a subpart of the second component of FIG. 6A.
Figure 7:
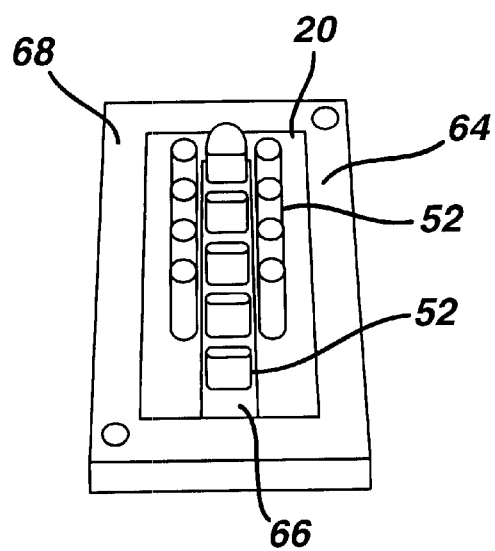
FIG. 7 is a perspective view of the second component of FIG. 6A rotated 90° and including a cover.

Referring to FIGS. 5 and 2B, during the tufting operation, one end 70 of a tuft 8 is inserted into a tuft hole 48 to a depth defined by the end wall 60 formed by end 58 of finger 52, such that the opposite end 72 of the inserted tuft 8 extends from the composite mold 10 to form a tuft filled composite mold. The tufts can be inserted into the composite mold according to a variety of techniques including, e.g., manually or in an automated operation such as, e.g., applying pneumatic pressure to propel a tuft along a tube and into the target tuft hole, placing picked bristles or tufts into the tuft holes using a robotic arm, and combinations thereof.

Figure 8:
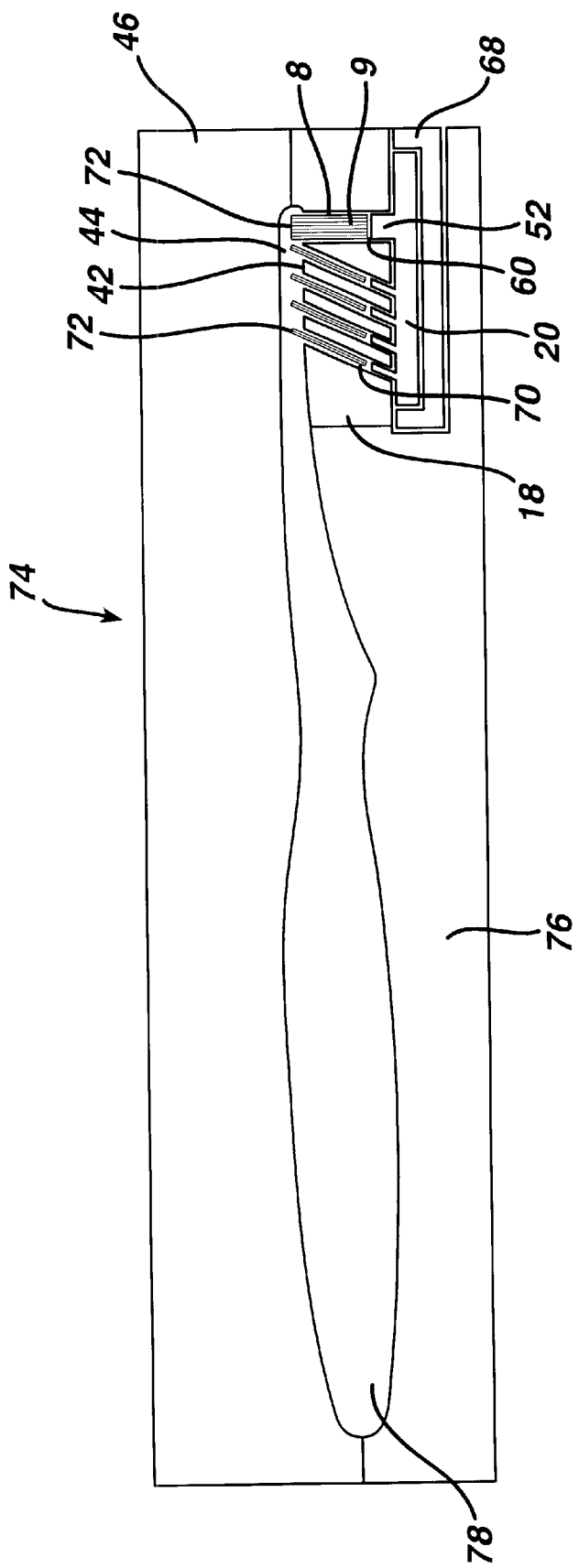
FIG. 8 is a view taken in cross-section of a portion of a toothbrush molding apparatus that includes the composite mold of FIG. 2A.

The tuft 8 filled composite mold 10 is then inserted into an apparatus 74 for molding brush bodies 3, as shown in FIG. 8. Brush molding apparatus 74 includes a first mold half 46 defining cavity 44 and a second mold half 76 defining cavity 78, which, when combined with composite mold cavity 42, define a toothbrush body 3. During the molding process, molding compound, e.g., polypropylene, is injected into cavities 78, 44, and 42 such that tuft ends 72 that extend from the composite mold 10 become embedded in the molding compound located in the head portion 6 of the brush body 3. When the molding operation is complete, the composite mold 10 and the toothbrush 2 formed thereby can be separated, whereupon the tuft ends 70 that had been within the tuft holes 48 of composite mold 10 become free and available for brushing an oral surface, e.g., teeth or gums.

Other embodiments are within the claims. For example, although the second surface 38 of composite mold 10 has been shown as being opposite the first surface 36, it is contemplated that the second surface 38 could be other than opposite the first surface 36. The transfer bar can also include any number of first components and second components including, e.g. a unitary second plastic component that includes a number of finger patterns corresponding to the tuft hole patterns of a first component. A single transfer bar can also include any number of first components having a variety of hole patterns, e.g., each first component can have a different hole pattern, and multiple first components having a first hole pattern in combination with multiple first components having a second hole pattern, different from the first hole pattern.

In addition, although the composite mold has been depicted in conjunction with a transfer bar, the composite mold can be free standing and can be used in an injection molding apparatus in the freestanding form.

What is claimed is:

1. A composite brush mold comprising:
   a) a first component comprising a pattern of holes extending from a first surface of said first component to a second surface of said first component, the holes being configured to receive tufts comprising at least one bristle; and
   b) a second component comprising a pattern of fingers that correspond to said pattern of holes, said fingers extending into said holes to form end walls, said end walls adapted to arrest travel of said tufts through said holes, said second component comprising plastic.

2. The mold of claim 1, further comprising a bar comprising an opening extending therethrough, said first component and said second component being positioned in said opening of said bar.

3. The mold of claim 2, wherein said bar further comprises guide pins positioned to align said first component in said opening of said bar.

4. The mold of claim 2, wherein said bar comprises a plurality of openings extending therethrough.

5. The mold of claim 4, further comprising a plurality of said first components and a plurality of said second components, said first components and said second components being positioned in said openings of said bar.

6. The mold of claim 2, wherein said opening in said bar extends through said bar in a first direction, said bar further comprising a ledge extending into said opening in a second direction, said second direction being substantially perpendicular to said first direction.

7. The mold of claim 1, wherein said first component comprises plastic.

8. The mold of claim 1, wherein said first component comprises plastic and said second component comprises plastic.

9. The mold of claim 1, wherein said first component further comprises a cavity located at said first surface of said first component such that said holes extend from said cavity, said cavity defining a portion of an oral brush from which tufts of bristles extend.

10. The mold of claim 1, wherein said second component further comprises a base, a first finger extending from said base at a first angle to said base, and a second finger extending from said base at a second angle to said base, said second angle being different from said first angle.

11. The mold of claim 10, wherein said second component further comprises a base secured to said first component, said fingers extending from said base.

12. The mold of claim 1, further comprising a cover positioned to maintain said fingers in position within said first component.

13. The mold of claim 1, wherein at least one of said holes, when taken in cross-section, defines a shape selected from the group consisting of a circle, triangle, square, rectangle, rhombus, ellipse, star, oval, and crescent.

14. The mold of claim 1, wherein said pattern of holes comprises a first plurality of holes and a second plurality of holes.

15. The mold of claim 14, wherein said second component comprises
   a first plurality of fingers dimensioned to be inserted into said first plurality of holes, and
   a second plurality of fingers dimensioned to be inserted into said second plurality of holes.

16. The mold of claim 14, wherein said first plurality of holes extend at a first angle to said first surface, and said second plurality of holes extend at a second angle to said first surface, said second angle being different from said first angle.

17. The mold of claim 16, wherein said second component comprises
   a base;
   a first plurality of fingers extending from said base at an angle corresponding to said angle of said first plurality of holes; and
   a second plurality of fingers extending from said base at an angle corresponding to said angle of said second plurality of holes.

18. The mold of claim 14, wherein said second component further comprises
   a first subpart comprising a base and a first plurality of fingers corresponding to said first plurality of holes; and
   a second subpart comprising a base and a second plurality of fingers corresponding to said second plurality of holes.

19. The mold of claim 14, wherein said first plurality of holes have a first cross-section, and said second plurality of holes have a second cross-section, said first cross-section being different from said second cross-section.

20. The mold of claim 19, wherein said second component further comprises:
   a first subpart comprising a base and a first plurality of said fingers corresponding to said first plurality of holes; and
   a second component comprising a base and a second plurality of said fingers corresponding to said second plurality of holes.

21. The mold of claim 19, wherein said first plurality of holes are circular in cross-section.

22. The mold of claim 19, wherein said first plurality of holes are elliptical in cross-section.

23. The mold of claim 19, wherein said first plurality of holes are circular in cross-section and said holes of said second plurality of holes are elliptical in cross-section.

24. The mold of claim 1, wherein said composite mold is dimensioned to be inserted into an apparatus for manufacturing oral brushes.

25. The mold of claim 1, wherein said second component comprises a plastic selected from the group consisting of polyethylene, polypropylene, polyurethane, and combinations thereof.

26. A composite mold comprising:
   a) a bar having a plurality of openings extending therethrough;
   b) a first plastic component comprising a pattern of holes extending from a first surface of said first component to a second surface of said first component, the holes being configured to receive tufts comprising at least one bristle; and
   c) a second plastic component comprising a pattern of fingers that correspond to said pattern of holes, said fingers extending into said holes to form end walls,
   said first and second components being positioned in an opening of said bar.

27. The mold of claim 26, further comprising a plurality of said first and said second components, each of said first and second components being positioned in an opening of said bar.

28. A composite brush mold comprising:
   a) a first component comprising—a pattern of holes extending from a first surface of said first component to a second surface of said first component, the holes being configured to receive tufts comprising at least one bristle; and
   b) a second component comprising a pattern of fingers that correspond to said pattern of holes, said fingers extending into said holes to form end walls; and
   c) a bar comprising an opening extending therethrough, said first component and said second component being positioned in said opening of said bar.

* * * * *